US006878393B2

(12) United States Patent
Sakai et al.

(10) Patent No.: US 6,878,393 B2
(45) Date of Patent: Apr. 12, 2005

(54) SOYBEAN PROCESSED FOOD

(75) Inventors: Tetsufumi Sakai, Akita (JP); Shinji Shimada, Akita (JP); Yoshitake Takada, Akita (JP); Yuhi Kono, Akita (JP); Akio Kikuchi, Kagawa (JP); Masanori Tezuka, Miyagi (JP); Isao Kunishi, Miyagi (JP); Hiroaki Asao, Aichi (JP); Kimiko Tsuzuki, Aichi (JP)

(73) Assignees: Incorporated Administrative Agency National Agriculture and Bio-oriented Research Organization, Tsukuba (JP); Taisha Food Inc., Sannohe-gun (JP); Marusan-Ai Co., Ltd., Okazaki (JP)

( * ) Notice: Subject to any disclaimer, the term of this patent is extended or adjusted under 35 U.S.C. 154(b) by 31 days.

(21) Appl. No.: 10/263,844

(22) Filed: Oct. 4, 2002

(65) Prior Publication Data

US 2003/0190403 A1 Oct. 9, 2003

(30) Foreign Application Priority Data

Mar. 27, 2002 (JP) ........................................ 2002-088449

(51) Int. Cl.$^7$ ........................... A23L 1/20; A23L 1/211
(52) U.S. Cl. ........................................ 426/634; 426/580
(58) Field of Search ................................. 426/634, 580

(56) References Cited

U.S. PATENT DOCUMENTS 4,985,259 A * 1/1991 Nii
5,017,386 A * 5/1991 Hildebrand et al.
6,426,112 B1 * 7/2002 Boatright

FOREIGN PATENT DOCUMENTS

JP 60-126078 * 7/1985
JP 60-224462 * 11/1985
JP 62-294040 * 12/1987

OTHER PUBLICATIONS

T. Sakai, et al. "Breeding and Evaluation of Low–Glycoside Content Soybean Lines for Improving Its Products Taste," The Summary of the 100$^{th}$ Meeting of the Japanese Society of Breeding, Oct. 7 & 8, 2001, Kyushu University; Breeding Research vol. 3, Supplementary vol. No. 2, Sep. 2001, p. 231, 2001 & with partial English translation.

K. Okudo, et al. "Components Responsible for the Undesireable Taste of Soybean Seeds" Bosci. Biotech. Biochem. 56 (1) 1992, pp. 99–103.

A. Kikuchi, et al. "Inheritance and Characterization of a Null Allele for Group A Acetyl Saponins Found in a Mutant Soybean (Glycine Max (L.) Merrill)" Breeding Science 49, pp. 167–171, 1999.

N. Shimada, et al. "Results and Prospects in Soybean Breeding in National Agricultural Research Center for Tohoku Region" Breeding Research 3, pp. 109–114, 2001, with partial English translation.

Tsukamoto et al., Japanese Journal of Breeding, vol. 43 (Suppl. 2) page 161 (1993) w/English Translation.

Kikuchi et al., Japanese Journal of Breeding, vol. 44 (Suppl. 1), page 206, (1994) w/English Translation.

Tsukamoto et al., American Chemical Society, Washington, DC 1994, pages 373–379.

* cited by examiner

Primary Examiner—Anthony Weier
(74) Attorney, Agent, or Firm—Oblon, Spivak, McClelland, Maier & Neustadt, P.C.

(57) ABSTRACT

A delicious, multifunctional soybean food, which has no unpleasant odor specific for a soybean and a less astringent taste. A soybean which completely lacks lipoxygenase and lacks group A acetyl saponin or soyasapogenol A, is used.

4 Claims, No Drawings

SOYBEAN PROCESSED FOOD

FIELD OF THE INVENTION

The present invention relates to a delicious food having no unpleasant odor and a less astringent taste, which uses a soybean which completely lacks lipoxygenase that is a causative substance of an unpleasant odor specific for a soybean, and lacks group A acetyl saponin or soyasapogenol A that are causative substances for an astringent taste.

BACKGROUND OF THE INVENTION

When soybean is processed into food, there is an undesirable odor. This is called an unpleasant odor. The known causative substances for this unpleasant odor include aliphatic carbonyl compounds such as acetaldehyde, acetone and n-hexanal; aromatic carbonyl compounds such as benzaldehyde and protocatechu aldehyde; volatile fatty acids such as acetic acid, propionic acid, n-valeric acid, isovaleric acid, n-caproic acid, isocaproic acid, n-caprylic acid and pelargonic acid; volatile amines such as ammonia, monomethylamine, dimethylamine, trimethylamine and piperidine; volatile aliphatic alcohols such as methanol, ethanol, 2-pentanol, isopentanol, n-hexanol and n-heptanol; phenol acids such as vanillic acid, ferulic acid, gentisic acid, salicylic acid and hydroxybenzoic acid, etc. Of these, particularly, n-hexanal has a specific unpleasant odor similar to grassy smell.

The n-hexanal is a substance generating an unpleasant odor generated by oxidation of soybean oil by an enzyme, lipoxygenase, which exists in a soybean seed. That is to say, lipoxygenase is an enzyme, which adds molecular oxygen to unsaturated fatty acids having a cis or cis-1,4-pentadiene structure to generate hydro-peroxide. This enzyme exists broadly in the plant kingdom, and especially, a soybean seed contains a large amount of lipoxygenase. Lipoxygenase not only deteriorates soybean oil, but also its oxide generates n-hexanal, a causative substance for a grassy, unpleasant odor. This often becomes a cause for which a soybean is shunned as a food material.

Three types of lipoxygenases exist in a soybean seed, and each of them has a different optimal pH, substrate specificity, thermostability, etc. Any of these lipoxygenases is associated with generation of an unpleasant odor in a processing step of soybeans, but a soybean which lacks lipoxygenase has already been developed (Japan J. Breed., vol. 41, p.507, 1991).

To control oxidation of soybean oil or generation of an unpleasant odor by lipoxygenase, inactivation of this enzyme by a heat processing has mainly been carried out (Lebensm Wiss Technol., vol. 26, p.215, 1993). Moreover, several methods such as steaming (J. Food Process Preserv., vol. 10, p.177, 1986), extraction with an organic solvent (Report of Shikoku Agricultural Experiment Station, vol. 61, p. 31, 1997), processing by infrared radiation (Lebensm Wiss Technol., vol. 15, p. 139, 1982), and microwave processing (J. Am. Oil Chem. Soc., vol. 68, p. 744, 1991), have been attempted to eliminate the unpleasant odor that is generated.

In addition to the unpleasant odor, the unpleasant taste of soybean food is a factor preventing the widespread use of the food. After eating or drinking soybean food, we often feel irritated over the whole area of the mouth cavity and the throat. This irritating taste is similar to a slightly astringent taste. Such an unpleasant taste is felt especially after drinking soybean milk, and this taste is caused by reaction of a taste substance with a protein-like substance on the mucous membrane to generate slight paralysis of the nerve. This unpleasant taste is also called an astringent taste.

The ingredients causing such an astringent taste include polyphenols, oxidized phospholipid, oxidized fatty acid, saponin, isoflavone or the like, and in particular, saponin has a strong astringent taste.

Examples of known saponins include group A saponin, group B saponin, group E saponin, and aglycons thereof such as soyasapogenol A, soyasapogenol B and soyasapogenol E.

Since group A acetyl saponin and soyasapogenol A, which have the strongest astringent taste, are located in the hypocotyl of a soybean, that taste can be reduced by the process of peeling a soybean and eliminating the hypocotyl. However, it is difficult to completely eliminate the hypocotyl, and also there is a disadvantage that isoflavone, group B saponin and group E saponin that are functional ingredients in a soybean fruit body are lost simultaneously in the process.

SUMMARY OF THE INVENTION

It is the object of the present invention to improve an unpleasant odor and an unpleasant taste specific for a soybean processed food.

As a result of intensive studies by the present inventors directed toward the above object, the present inventors have produced a new soybean, which completely lacks lipoxygenase and lacks group A acetyl saponin or soyasapogenol A, and they have found that the above object can be achieved by using this soybean.

That is to say, the present invention relates to the following features (1) to (5):

(1) A soybean processed food comprising, as a main ingredient, a soybean which completely lacks lipoxygenase, and lacks group A acetyl saponin or soyasapogenol A.

(2) The soybean processed food according to (1) above, wherein a normal soybean is used in combination with the soybean.

(3) The soybean processed food according to (1) or (2) above, which is soybean milk or bean curd.

(4) A food which is produced by the combined use of a soybean which completely lacks lipoxygenase and lacks group A acetyl saponin or soyasapogenol A, and another food material.

(5) An ice cream comprising a soybean ingredient which completely lacks lipoxygenase, and lacks group A acetyl saponin or soyasapogenol A.

The soybean processed food comprising a soybean as a main ingredient of the present invention encompasses, for example, bean curd, soybean milk, dried bean curd, fried tofu, fermented soybeans, Gan-Modoki (another type of fried tofu) and so on.

The food produced by the combined use of the inventive soybean and another food material of the present invention encompasses, for example, jelly, pudding, beverage, bread, cake, ice cream and so on.

The soybean which completely lacks lipoxygenase and lacks group A acetyl saponin or soyasapogenol A used in the present invention has been produced by full use of searching through a wide range of genetic resources including a wild soybean, and breeding techniques such as mutagenesis by X-ray irradiation and hybridization. A soybean which completely lacks lipoxygenase and lacks group A acetyl saponin is called Tohoku 151 (old name: Karikei 651), whereas a soybean which completely lacks lipoxygenase and lacks soyasapogenol A is called Tohoku 152 (old name: Karikei 654). Both of these soybeans are conserved at the National Agricultural Research Center for Tohoku Region, an Independent Administrative Institution, the National Agricultural Research Organization, which is in fact the present applicant. These soybeans are ready to be provided for experiments, where such experiments are required to confirm the contents of the present specification.

The structural formulas of group A acetyl saponin and soyasapogenol A are as follows:

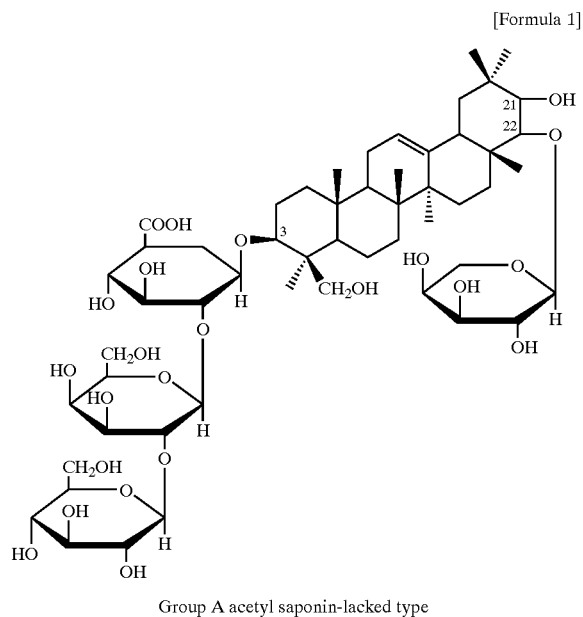

[Formula 1]

Group A acetyl saponin-lacked type

As shown in formula 1, in Tohoku 151, an acetylated sugar does not bind to arabinose at position C-22.

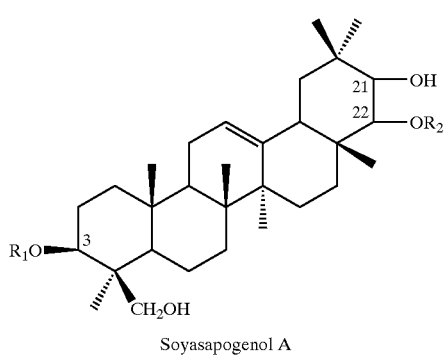

[Formula 2]

Soyasapogenol A wherein $R_1$ represents glucuronic acid and a sugar such as galactose, raffinose, arabinose or glucose, and
$R_2$ represents arabinose and a sugar such as xylose or glucose.

The Tohoku 152 is a soybean which lacks the aglycon of group A saponin, soyasapogenol A, represented by formula 2.

EXAMPLES
Example 1
Soybean Milk

A group of soybeans which completely lacks lipoxygenase and lacks group A acetyl saponin (sample A) or soyasapogenol A (sample B) was prepared as a test sample, and another group of normal soybeans (variety: Suzuyutaka) was prepared as a control sample. Each of the two types of eighty grams of soybean was soaked in the water at 4° C. for 18 hours. After soaking, each group of imbibed soybean was added a proper amount of water and ground so that 500 g of ground raw soybean could be obtained. Each ground raw soybean was heated at 97° C. for 5 minutes to produce boiled ground soybean. The thus produced boiled ground soybean was squeezed using a cloth so as to obtain soybean milk.

A taste comparison of these soybean milks was carried out by a sensory evaluation test. That is to say, while not revealing which type of soybean the sample was, 10 panelists were asked to taste these types of soybean milk to evaluate the following 5 points: astringency, unpleasant taste, unpleasant odor, sweetness and richness. The results are shown in Table 1.

TABLE 1

Results of sensory evaluation test of both soybean milk produced from soybeans which completely lack lipoxygenase and lack group A acetyl saponin or soyasapogenol A, and soybean milk produced from normal soybeans

| | Astringency | Un-pleasant taste | Un-pleasant odor | Sweetness | Richness |
|---|---|---|---|---|---|
| Sample A | 3.8 | 3.9 | 3.9 | 3.4 | 3.7 |
| Sample B | 3.7 | 3.9 | 3.9 | 3.5 | 3.6 |
| Control | 2.9 | 3.0 | 3.1 | 3.1 | 3.1 |
| | Weak 5 ↓ Medium 3 ↓ Strong 1 | Weak 5 ↓ Medium 3 ↓ Strong 1 | Weak 5 ↓ Medium 3 ↓ Strong 1 | Strong 5 ↓ Medium 3 ↓ Weak 1 | Strong 5 ↓ Medium 3 ↓ Weak 1 |

Sample A: soybean milk produced from soybeans which completely lack lipoxygenase and lack group A acetyl saponin
Sample B: soybean milk produced from soybeans which completely lack lipoxygenase and lack soyasapogenol A
Control: soybean milk produced from normal soybeans (variety: Suzuyutaka)

Average Sensory Evaluation Scores of 10 Panelists

As shown in Table 1, soybean milk produced from soybeans which completely lack lipoxygenase and lack group A acetyl saponin (sample A) or soyasapogenol A (sample B), clearly had lesser astringency, unpleasant taste and unpleasant odor, but more sweetness and richness than a control product, soybean milk produced from Suzuyutaka soybeans.

Example 2
Tofu(Soybean Curd)

A group of soybeans completely lacking lipoxygenase and lacking group A acetyl saponin (sample A) or soyasapogenol A (sample B) was prepared as a test sample, and another group of normal soybeans (variety: Suzuyutaka) was prepared as a control sample. Each of the two types of eighty grams of soybean was soaked in the water at 4° C. for 18 hours. After soaking, each group of imbibed soybean was added a proper amount of water and ground so that 500 g of ground raw soybean could be obtained. Each ground raw soybean was heated at 97° C. for 5 minutes to produce boiled ground soybean. The thus produced boiled ground soybean was squeezed using a cloth so as to obtain soybean milk. Thereafter, magnesium chloride was added to the soybean milk at 0.3% of the amount of the soybean milk. The mixture was transferred to a vessel and then it was heated at 85° C. for 45 minutes to obtain tofu. A taste comparison of these tofus was carried out by a sensory evaluation test. That is to say, while not revealing which type of tofu the sample was, 10 panelists were asked to taste these tofus to evaluate the following 5 points: astringency, unpleasant taste, unpleasant odor, sweetness and richness. The results are shown in Table 2.

TABLE 2

Results of sensory evaluation test of both tofu produced from soybeans completely lacking lipoxygenase and lacking group A acetyl saponin or soyasapogenol A, and tofu produced from normal soybeans

|  | Astringency | Un-pleasant taste | Un-pleasant odor | Sweetness | Richness |
|---|---|---|---|---|---|
| Sample A | 3.5 | 3.4 | 3.6 | 3.4 | 3.5 |
| Sample B | 3.4 | 3.5 | 3.5 | 3.5 | 3.4 |
| Control | 3.0 | 2.9 | 2.8 | 3.0 | 3.1 |
|  | Weak 5 | Weak 5 | Weak 5 | Strong 5 | Strong 5 |
|  | ↓ | ↓ | ↓ | ↓ | ↓ |
|  | Medium 3 | Medium 3 | Medium 3 | Medium 3 | Medium 3 |
|  | ↓ | ↓ | ↓ | ↓ | ↓ |
|  | Strong 1 | Strong 1 | Strong 1 | Weak 1 | Weak 1 |

Sample A: Tofu produced from soybeans which completely lack lipoxygenase and lack group A acetyl saponin
Sample B: Tofu produced from soybeans which completely lack lipoxygenase and lack soyasapogenol A
Control: Tofu produced from normal soybeans (variety: Suzuyutaka)

Average Sensory Evaluation Scores of 10 Panelists

As shown in Table 2, tofu produced from soybeans which completely lack lipoxygenase and lack group A acetyl saponin (sample A) or soyasapogenol A (sample B), clearly had lesser astringency, unpleasant taste and unpleasant odor, but more sweetness and richness than a control product, tofu produced from Suzuyutaka soybeans.

Example 3

A group of soybeans completely lacking lipoxygenase and lacking group A acetyl saponin (sample A) or soyasapogenol A (sample B) was prepared as a test sample, whereas a group of normal soybeans (control, variety: Suzuyutaka) as a control sample, a group of soybeans which completely lacks lipoxygenase (Tohoku 135) and a group of soybeans produced in the United States were prepared.

According to a common production method, soybeans produced in the United States were subjected to peeling and elimination of hypocotyls before production of the soybean milk. Other groups of soybeans were directly subject to production of soybean milk without peeling and elimination of hypocotyls. One hundred grams of each variety was washed with hot water of 80° C., immediately followed by addition of 700 g of 80° C. hot water, and the mixture was subjected to being ground. The obtained ground raw soybean was retained at 80° C. for 5 minutes. Subsequently, dried bean curd was separated using a centrifugal separator (3,000 rpm), so that 650 g of soybean milk was obtained.

Panelists were asked to taste these soybean milks to provide a total evaluation in 4 grades and evaluations of astringent taste in 3 grades as well as being asked to make comments regarding the tendency of taste. The results are shown in Table 3.

TABLE 3

Sensory evaluation test of soybean milk produced from soybeans which completely lack lipoxygenase and lack group A acetyl saponin or soyasapogenol A, and soybean milk produced from each of normal soybeans, soybeans which completely lack lipoxygenase, and soybeans produced in the United States and undergone peeling and elimination of hypocotyls.

| Variety | Total evaluation | Astringent taste | Tendency of taste |
|---|---|---|---|
| Control | X | +++ | Strong astringent taste, but weak acridness |
| Lipoxygenase completely lacked Soybean (Tohoku 135) | XX | +++ | Strong astringent taste, strong ester odor. Acridness. |
| Sample A | ○ | + | Weak astringent taste, clean and smooth to drink. |
| Sample B | Δ | + | Creamy and milky taste. Slight ester odor. |
| Soybean produced in the USA and subjected to peeling and elimination of the hypocotyls | ○ | + | Weak astringent taste with no grassy odor. Richness. |

Control: soybean milk produced from standard soybeans (variety: Suzuyukata)
Sample A: soybean milk produced from soybeans which completely lack lipoxygenase and lack group A acetyl saponin
Sample B: soybean milk produced from soybeans which completely lack lipoxygenase and lack soyasapogenol A
Total evaluation: ○: tasty, Δ: nothing special, X: bad, XX: very bad
Astringent taste: +++: very strong, ++: strong, +: weak Summary of the Evaluations of 10 Panelists As shown in Table 3, the soybean milk produced from soybeans which completely lack lipoxygenase and lack group A acetyl saponin or soyasapogenol A had a weaker astringent taste and a higher total evaluation than the soybean milk of the standard soybeans or the soybeans which completely lack lipoxygenase. The soybean milk from the test sample soybeans also had a good tendency of taste and the level of the tendency of taste was comparable to the soybean milk produced from soybeans produced in the United States and undergone peeling and elimination of hypocotyls.

From this result, it was found that a soybean which completely lacks lipoxygenase and lacks group A acetyl saponin or soyasapogenol A does not need peeling and hypocotyl eliminating processes, which correspond to 25% of the total processes, thereby reducing processing steps, and that it becomes possible to produce a soybean milk product having a good taste, while the product retains a hypocotyl containing a substantial amount of functional ingredients.

Production Process of Soybean Milk

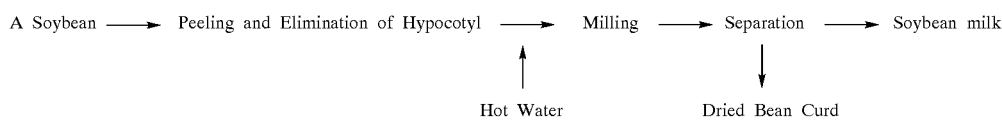

A Soybean ⟶ Peeling and Elimination of Hypocotyl ⟶ Milling ⟶ Separation ⟶ Soybean milk
↑ ↓
Hot Water Dried Bean Curd

Example 4

Cow's Milk-Mixed Soybean Milk Ice Cream

According to the method in Example 1, soybean milk was produced from each of soybeans which completely lack lipoxygenase and lack group A acetyl saponin (sample A) or soyasapogenol A (sample B) as a test sample and standard soybeans (control, variety: Suzuyutaka). Two hundred ml of the soybean milk (5° C.) was mixed with 200 ml of cow's milk (5° C.), and 40 g of sugar was added thereto followed by leaving at −20° C. for 30 minutes. Thereafter, 2 ml of vanilla extract, 40 g of sugar and 100 g of fresh cream were further added thereto, and the mixture was stirred followed by freezing at −20° C. for 3 hours. After freezing, the obtained product was stirred and then further frozen at −20° C. for 30 minutes. The operation after freezing was repeated 3 times to obtain a cow's milk-mixed soybean milk ice cream.

TABLE 4

Results of sensory evaluation test of cow's milk-mixed soybean milk ice cream produced from soybeans which completely lack lipoxygenase and lack group A acetyl saponin or soyasapogenol A, and cow's milk-mixed soybean milk ice cream produced from normal soybeans

|  | Astringency | Unpleasant taste | Sweetness | Richness |
|---|---|---|---|---|
| Sample A | 3.8 | 3.9 | 3.4 | 3.7 |
| Sample B | 3.7 | 3.9 | 3.5 | 3.6 |
| Control | 2.9 | 3.0 | 3.4 | 3.7 |
|  | Weak 5 ↓ Medium 3 ↓ Strong 1 | Weak 5 ↓ Medium 3 ↓ Strong 1 | Strong 5 ↓ Medium 3 ↓ Weak 1 | Strong 5 ↓ Medium 3 ↓ Weak 1 |

Sample A: cow's milk-mixed soybean milk ice cream produced from soybeans which completely lack lipoxygenase and lack group A acetyl saponin
Sample B: cow's milk-mixed soybean milk ice cream produced from soybeans which completely lack lipoxygenase and lack soyasapogenol A
Control: cow's milk-mixed soybean milk ice cream produced from normal soybeans (variety: Suzuyutaka)

Average of Sensory Evaluation Scores of 10 Panelists

As shown in Table 4, cow's milk-mixed soybean milk ice cream produced from soybeans which completely lack lipoxygenase and lack group A acetyl saponin (sample A) or soyasapogenol A (sample B), clearly had lesser astringency and unpleasant taste than cow's milk-mixed soybean milk ice cream produced from stndard soybeans as a control.

Effect of the Invention

According to the present invention, it is possible to provide a food having a less unpleasant odor and a less unpleasant taste, which are specific for a soybean, without eliminating a hypocotyl thereof containing a large amount of functional ingredients.

What is claimed is:

1. A soybean processed food, comprising, as a main ingredient, a soybean, which is genetically improved by radiation breeding and hybridization breeding compared to a soybean which has not undergone radiation breeding and hybridization, wherein the genetically improved soybean does not contain any endogenous lipoxygenase and one of group A acetyl saponin or soyasapogenol A.

2. The soybean processed food of claim 1, which is soybean milk.

3. The soybean processed food of claim 1, which is soybean curd.

4. The soybean processed food of claim 1, which is ice cream.

* * * * *

UNITED STATES PATENT AND TRADEMARK OFFICE
CERTIFICATE OF CORRECTION

PATENT NO. : 6,878,393 B2
DATED : April 12, 2005
INVENTOR(S) : Tetsufumi Sakai et al.

It is certified that error appears in the above-identified patent and that said Letters Patent is hereby corrected as shown below:

<u>Title page,</u>
Item [73], Assignees, "Taisha Food Inc." should read -- Taishi Food Inc. --.

Signed and Sealed this

Twelfth Day of July, 2005

JON W. DUDAS
*Director of the United States Patent and Trademark Office*